(12) United States Patent
Sansone

(10) Patent No.: US 6,547,136 B1
(45) Date of Patent: Apr. 15, 2003

(54) VERIFIABLE CARRIER PAYMENT METHOD FOR RETURNING MERCHANDISE

(75) Inventor: Ronald P. Sansone, Weston, CT (US)

(73) Assignee: Pitney Bowes, Inc., Stamford, CT (US)

( * ) Notice: Subject to any disclaimer, the term of this patent is extended or adjusted under 35 U.S.C. 154(b) by 128 days.

(21) Appl. No.: 09/723,021

(22) Filed: Nov. 27, 2000

(51) Int. Cl.$^7$ .............................................. G06F 17/60
(52) U.S. Cl. ...................................... 235/385; 235/375
(58) Field of Search ................................ 235/381, 383, 235/375, 380, 379, 493, 382; 705/26, 28, 408, 5, 27

(56) References Cited

U.S. PATENT DOCUMENTS

| | | | |
|---|---|---|---|
| 4,839,505 A | * 6/1989 | Bradt et al. .................. | 194/906 |
| 4,866,661 A | * 9/1989 | de Prins ...................... | 235/375 |
| 4,887,208 A | * 12/1989 | Schneider et al. ........... | 235/385 |
| 5,111,030 A | 5/1992 | Brasington et al. .......... | 235/375 |
| 5,468,110 A | * 11/1995 | McDonald et al. .......... | 414/268 |
| 5,659,163 A | * 8/1997 | Lagan et al. ................. | 235/375 |
| 5,844,221 A | * 12/1998 | Madigan et al. ............. | 235/375 |
| 2001/0018660 A1 | * 8/2001 | Sehr ............................... | 705/5 |
| 2001/0044785 A1 | * 11/2001 | Stolfo et al. .................... | 705/74 |
| 2002/0010689 A1 | * 1/2002 | Tibbs et al. ................... | 705/408 |
| 2002/0010708 A1 | * 1/2002 | McIntosh ...................... | 707/500 |
| 2002/0019785 A1 | * 2/2002 | Whitman ........................ | 705/28 |
| 2002/0032612 A1 | * 3/2002 | Williams et al. ............... | 705/26 |
| 2002/0032613 A1 | * 3/2002 | Buettgenbach et al. ....... | 705/26 |
| 2002/0083013 A1 | * 6/2002 | Rollins et al. ................. | 705/76 |

FOREIGN PATENT DOCUMENTS

WO   WO00/29995   * 5/2000

* cited by examiner

Primary Examiner—Thien M. Le

(57) ABSTRACT

A Merchandise Return Label may be printed with a unique number on a buyer's computer printer and paid for by the seller's postage meter. Goods mailed with the Merchandise Return Label will be considered metered mail. Returned goods may be delivered directly to the buyer, and postal employees will not have to manually complete the Merchandise Return Label. Since the mailing of the returned goods was paid for by a postage meter, the Post Office would not have to receive payment from the seller when the seller receives the package.

21 Claims, 14 Drawing Sheets

VERIFIABLE CARRIER PAYMENT METHOD FOR RETURNING MERCHANDISE

CROSS REFERENCE TO RELATED APPLICATIONS

Reference is made to commonly assigned copending patent application Ser. No. 09/722,812 filed herewith entitled "A Method For Returning Merchandise" in the names of Ronald P. Sansone, Ian A. Siveyer, Ahjaz A. Sethi, Robert A. Law, Susan Garvey; and Brian J. Moughty.

FIELD OF THE INVENTION

This invention pertains to commercial transactions and, more particularly, to the return of delivered merchandise with verifiable labels.

BACKGROUND OF THE INVENTION

In the past, buyers of goods typically went from store to store to determine which goods they wanted to purchase. Buyers of clothing had an opportunity to try on the clothing and determine how the clothing looked on them. The buyers were also able to observe the type of fabric used to manufacture the clothing, the color of the fabric, and the quality of the clothing. When buyers purchased electronic goods, i.e., television sets, radios, clocks, computer, computer peripherals, digital cameras, stereos, etc., the buyer had an opportunity to observe the performance of the electronic goods. Buyers of books had an opportunity to read passages from books. Buyers of furniture had an opportunity to sit in a chair and determine how comfortable the chair was. The buyer could also examine the chair and determine the type of wood that was used to manufacture the chair and the quality of the chair. Thus, buyers of merchandise that were sold in stores had an opportunity to view and examine the goods that were offered for sale before they purchased the goods. Hence, the buyers knew what they were buying before they purchased the goods.

Many goods are currently being offered for sale from a catalog or over the internet. The prospective buyer of goods offered for sale from a catalog or the internet may have an opportunity to view an image of the goods offered for sale on a printed page and/or a display screen. The prospective buyer would not have an opportunity to view and examine the goods before they purchased the goods. Consequently, the buyer may be of the opinion that purchased clothing has a different fabric and color than what was shown in the internet or catalog picture. The buyer may also be of the opinion that the clothing was of inferior quality. Buyers of electronic goods often believed the equipment did not function in the manner they expected. Buyers of books and furniture also were of the opinion that the purchased books and/or furniture did not meet their expectations. Thus, the buyers of goods from catalogs or over the internet often wanted to return to the seller the purchased goods and receive their money back.

Typically, the buyer would telephone the seller and inform the seller that the buyer would like to return some or all of the purchased goods. The seller may send the buyer a Merchandise Return Label, tell the buyer to pack the goods that they want to return in the package in which the goods were sent, and affix the aforementioned label to the package. The buyer would have to write the buyer's address on the label.

Current United States Postal Service Regulations regarding Merchandise Return Labels consider that goods mailed with the foregoing labels are "permit mail". Permit mail having the above labels will not be delivered directly to the seller, but will be delivered to the United States Post Office that issued the permit number. Thus, the seller will be inconvenienced by having to pick up the package containing the returned goods at the post office that issued the permit number. When the package containing the returned goods arrives at the Post Office, a postal employee will have to manually weigh the package; determine the postage that is due; complete the Merchandise Return Label; and receive payment from the permit holder when the permit holder receives the package. The above process is expensive, time-consuming and labor-intensive.

Copending U. S. Patent Application Docket No. F-185 filed herewith entitled "A Method For Returning Merchandise" solves the foregoing problems by providing a new type of Merchandise Return Label that may be printed on a buyer's computer printer and paid for by the seller's postage meter. Goods mailed with the new type of Merchandise Return Label will be considered "metered mail". Returned goods may be delivered directly to the buyer, and postal employees will not have to manually complete the new type of Merchandise Return Label. Since the mailing of the returned goods was paid for by a postage meter, the Post Office would not have to receive payment from the seller when the seller receives the package.

One of the disadvantages of the new Merchandise Return Label is that the Label can be photocopied and used to send many packages to the original sender on the same day that the original label is made. If the label is scanned and graphically edited by changing the date and other elements of the label on the recipient's computer, the recipient may send many packages, on any date, to the original sender without paying for their delivery. An example of a way in which the new Merchandise Return Label may be used is as follows. Mailer A addresses mail piece #1 containing a new Merchandise Return Label to recipient B. Recipient B receives mail piece #1 from mailer A and copies many Merchandise Return Labels addressed to original mailer A. Recipient B may then place a copied Merchandise Return Label on packages that are sent to Mailer A and have the packages delivered by the post without the payment of additional postage. The above procedure may be continued many times without the payment of postage.

SUMMARY OF THE INVENTION

This invention overcomes the disadvantages of the prior art by placing a unique number on Merchandise Return Labels so that the Label may not be scanned or photocopied and used more than once.

This invention accomplishes the foregoing by having the seller or shipper of the goods place a label or impression on every package, flat or mail piece that may be delivered with an indicia that is affixed thereto. The package, flat or mail piece (hereinafter "container") may be delivered by the post, a courier, or private delivery service, i.e., Federal Express®, United Parcel Service®, DHL®, Emory®, Airborne®, etc. The label or impression may include the meter number that paid for the delivery of the container, the serial number of the indicia, as well as the weight of the shipped container. Information contained in the label or impression or information stored in the meter will be sent by the meter that paid for the shipment of the container to a data center. If the buyer of the shipped container decides to return the goods in the container to the seller, the buyer may notify the seller or the data center by telephone, facsimile, post, or the internet, of their intention to return the goods. The seller or the data center may send the buyer information to complete the new Merchandise Return Label (if the Label was contained in the container) by telephone, facsimile, post, or the internet, or send the buyer a completed Merchandise Return Label by facsimile, post, or the internet. The seller's or shipper's meter will be debited for the cost of returning the container. The buyer will enter the information provided by the data center on the new Merchandise Return Label (if the label was contained in the container) and affix the completed label to the container or affix a new label that has been supplied by the data center to the container. Then the buyer will deposit the container containing the returned goods with the Post, a courier, or private delivery service so that the goods in the container may be delivered to the buyer. Prevention of duplicating and/or copying of the unique number on the Merchandise Return Label is enabled by detection of modified indicia on the Merchandise Return Label; the addition of a unique number on the Merchandise Return Label, and searching the Merchandise Return Label and the original label for duplicate entrees. The data center will pay the post, courier, or private delivery service the amount debit to the meter for the cost of returning the container. The data center may deduct a service charge or fee for its services in completing the above.

DETAILED DESCRIPTION OF THE PREFERRED EMBODIMENT

Figure 1:
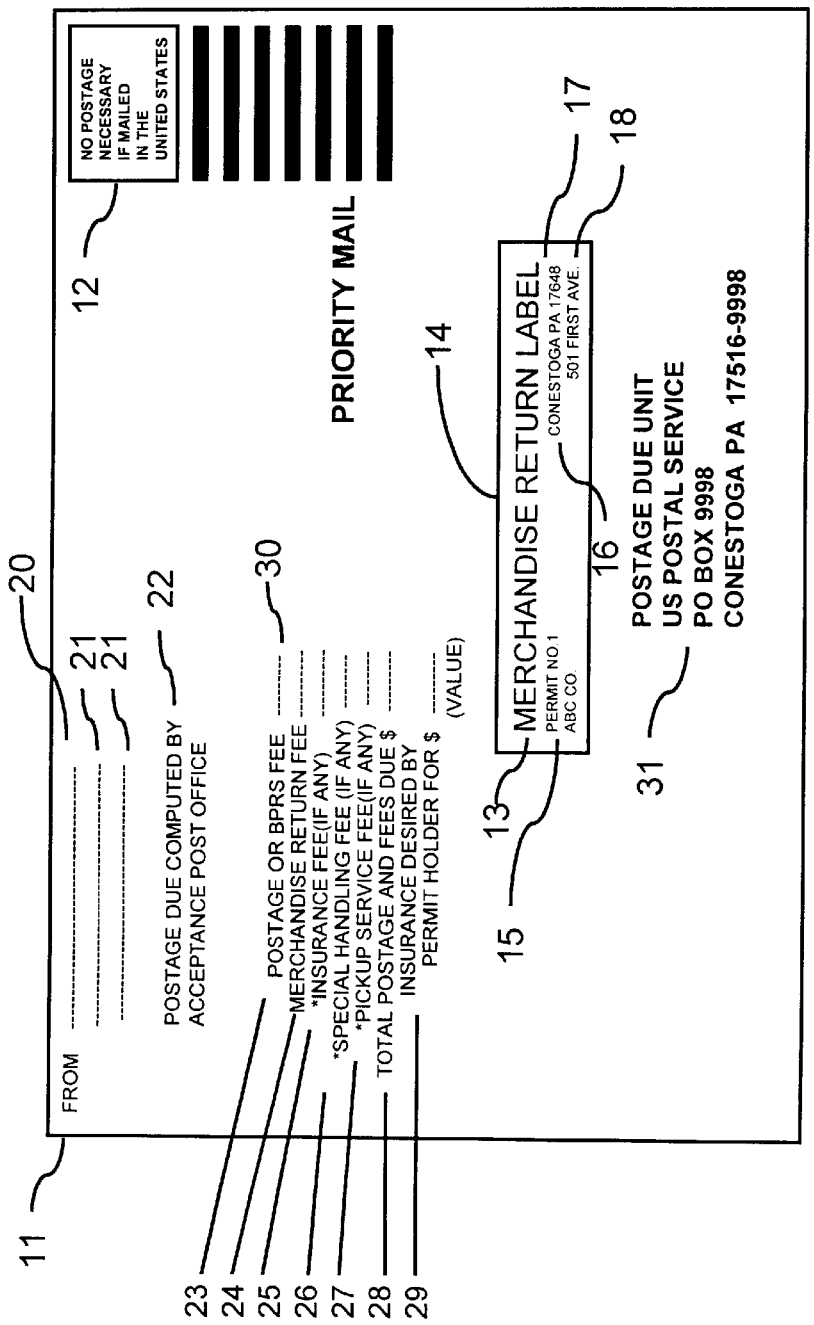
FIG. 1 is a drawing of a prior art Merchandise Return Label.

Referring now to the drawings in detail, and more particularly to FIG. 1, the reference character 11 represents a Merchandise Return Label. The endorsement 12 "No Postage Necessary If Mailed in the United States" is printed in the upper right corner of label 11. The expression 13 "Merchandise Return Label" is contained in rectangle 14. The permit number 15 of the sender of label 11, the name 16 and location 17 of the post office that issued permit number 15, and the name and address of permit holder 18 are also contained in rectangle 14. The rate of mail is indicated in space 19, the name of the buyer returning the goods will be printed in space 20, and the address of the buyer returning the goods will be printed in space 21 party. The expression 22 "Postage Due Computed By Acceptance Post Office" is printed below space 21. The special service endorsements: postage 23; merchandise return fee 24; delivery insurance fee 25; special handling fee 26; pickup service fee 27; total postage and fees due 28; and insurance desired 29 by permit holder for and spaces 30, are printed on label 11. The name and address 31 of the Postage Due Unit of the permit holder will be printed below rectangle 14. Personnel from the Postage Due Unit will weigh the container (not shown) that label 11 is affixed to and enter the applicable fees in spaces 30. The entering of fees into spaces 30 is labor-intensive and, consequently, costs the post a great deal of money. Additionally, the container will be held at the Postage Due Unit until the permit holder physically pays for the postage and accepts the container.

Figure 2:
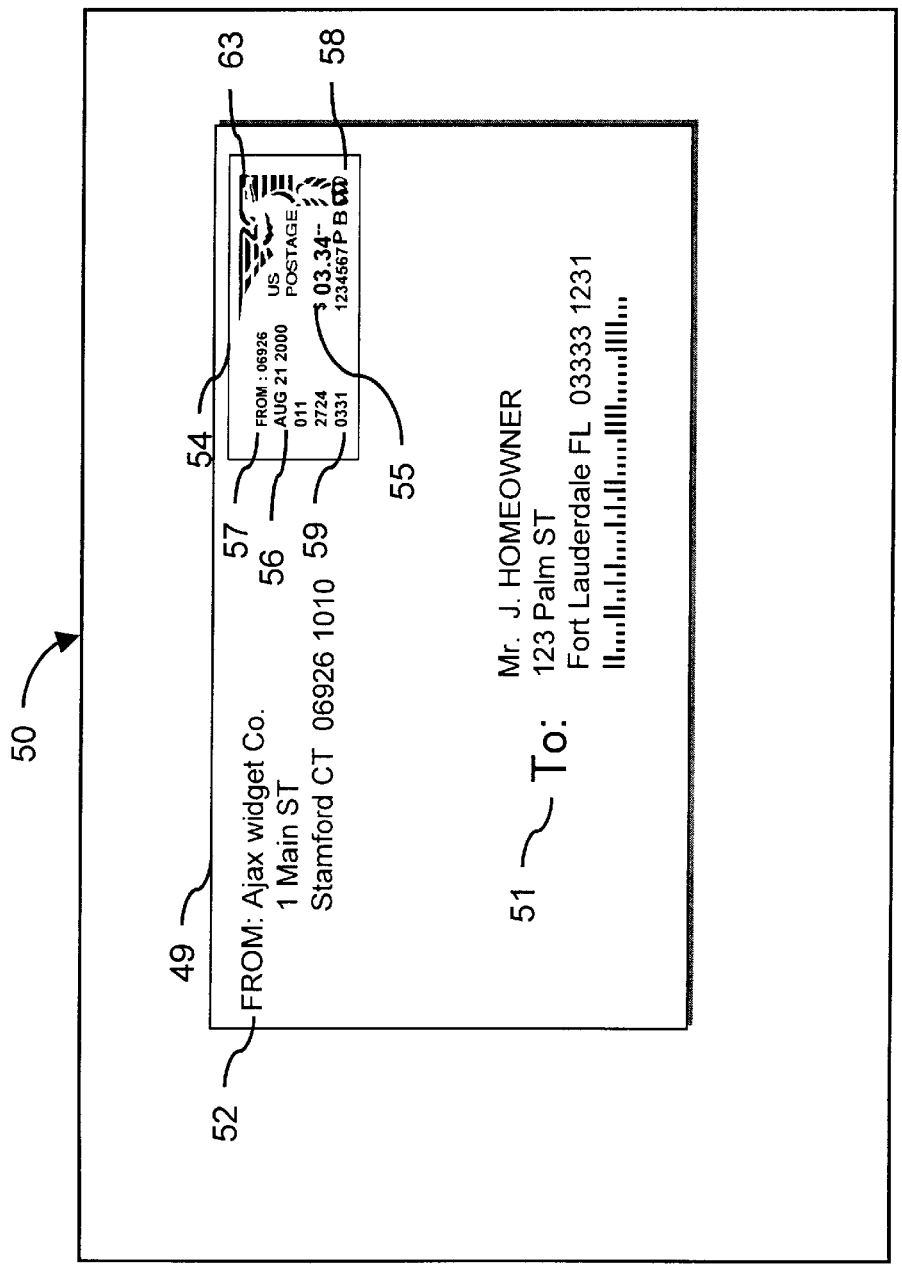
FIG. 2 is a drawing of a label 49 affixed to a container 50 that is sent to a buyer by a seller of goods.

FIG. 2 is a drawing of a label 49 affixed to a container 50 that is sent to a buyer by a seller of goods. It will be obvious to one skilled in the art that the information in label 49 may be directly printed on container 50. Label 49 has a buyer or recipient address field 51, and a seller or sender address field 52. A postal indicia 54 is affixed to label 49. Indicia 54 contains a dollar amount 55, the date 56 that postal indicia 54 was affixed to label 49, the place 57 that mail piece 10 was mailed, the postal meter serial number 58, an eagle or other graphic representation 63, and a security code 59. The combination of date 56, meter serial number 58 and security code 59 produces a unique number. It would be obvious to one skilled in the art that indicia 54 may be an information-based indicia or other type of indicia (if required) recognized by the carrier.

Figure 3A:
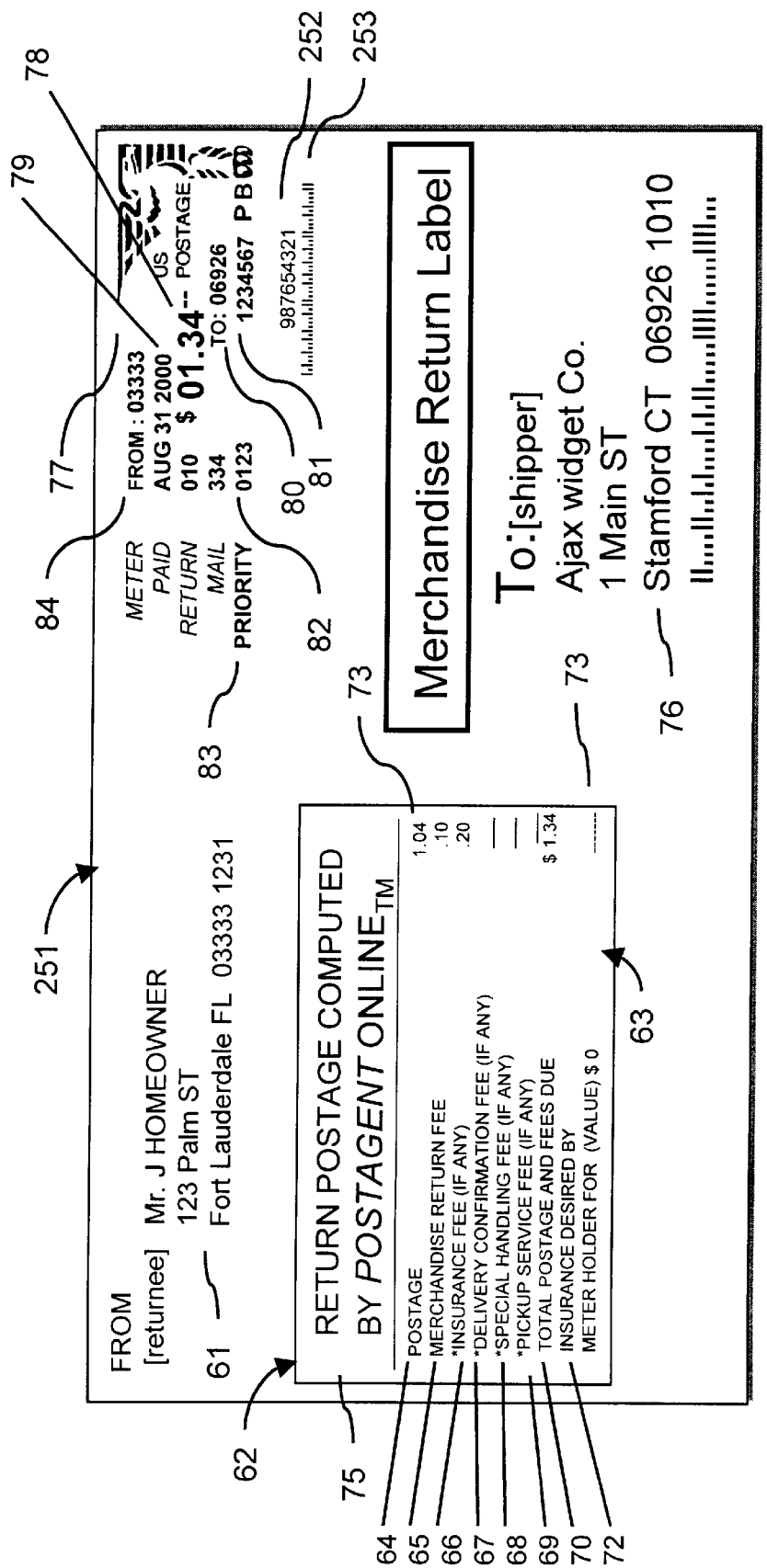
FIG. 3A is a drawing of a new Merchandise Return Label 251 that has a replica of an indicia affixed thereto.
Figure 4:
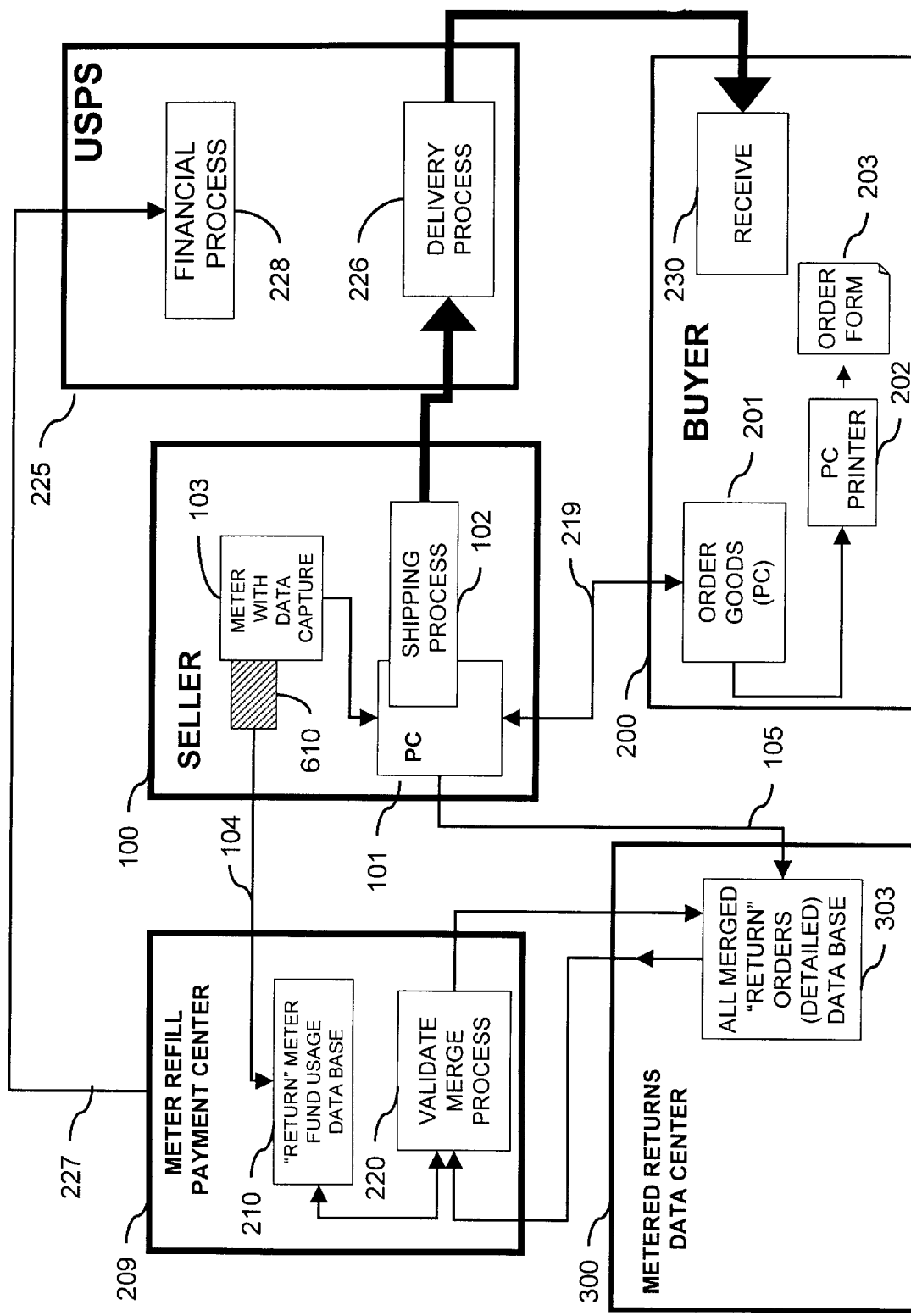
FIG. 4 is a drawing showing the manner in which goods are ordered.

FIG. 3A is a drawing of a new Merchandise Return Label 251 that has a replica of an indicia that is attached thereto. The postage for printing label 251 is charged to an account associated with meter 103 (FIG. 4). Label 251 was printed by printer 202 (FIG. 4). The buyer's name and address 61 or the name and address of the person who is returning the goods are printed in the upper left corner of label 251. The name of the entity that computed the postage 75 that is due to deliver the goods that label 251 is affixed to is contained in rectangle 62. The charges: amount of postage 64 to deliver the goods that label 251 is affixed to; merchandise return fee 65; insurance fee 66; delivery confirmation fee 67; special handling fee 68; pick up service fee 69; total postage and fees due 70; and insurance desired by meter holder 72 for (value) $0, are contained in rectangle 63. Spaces 73 are used by the entity that computed the postage 75 for entering: the amount of postage 64; the merchandise return fee 65; the insurance fee 66; the delivery confirmation fee 67; the special handling fee 68; the pick up service fee 69; the total postage and fees due 70; the insurance desired by meter holder 72. The name and address 76 of the seller or person to whom the goods are being shipped appear in the bottom right of label 251. The postal indicia 77 contains a dollar amount 78 for the total postage and fees due, the date 79 that the postal indicia was affixed to label 251, the zip code 80 of the seller of the returned goods; the zip code 84 of the buyer who is returning the goods; the postal meter serial number 81; and a security code 82. The class of mail 83 that label 251 is going to be affixed to appears in the right corner of label 251. A unique number 252 appears below indicia 77. Number 252 is encrypted and includes the date and time that indicia 54 was printed on label 49 and the weight of container 50 when it was originally sent from Ajax Widget Co. to Mr. J. Homeowner. Bar code 253 appears below number 252. Bar code 253 is a bar code representation of number 252.

Figure 3B:
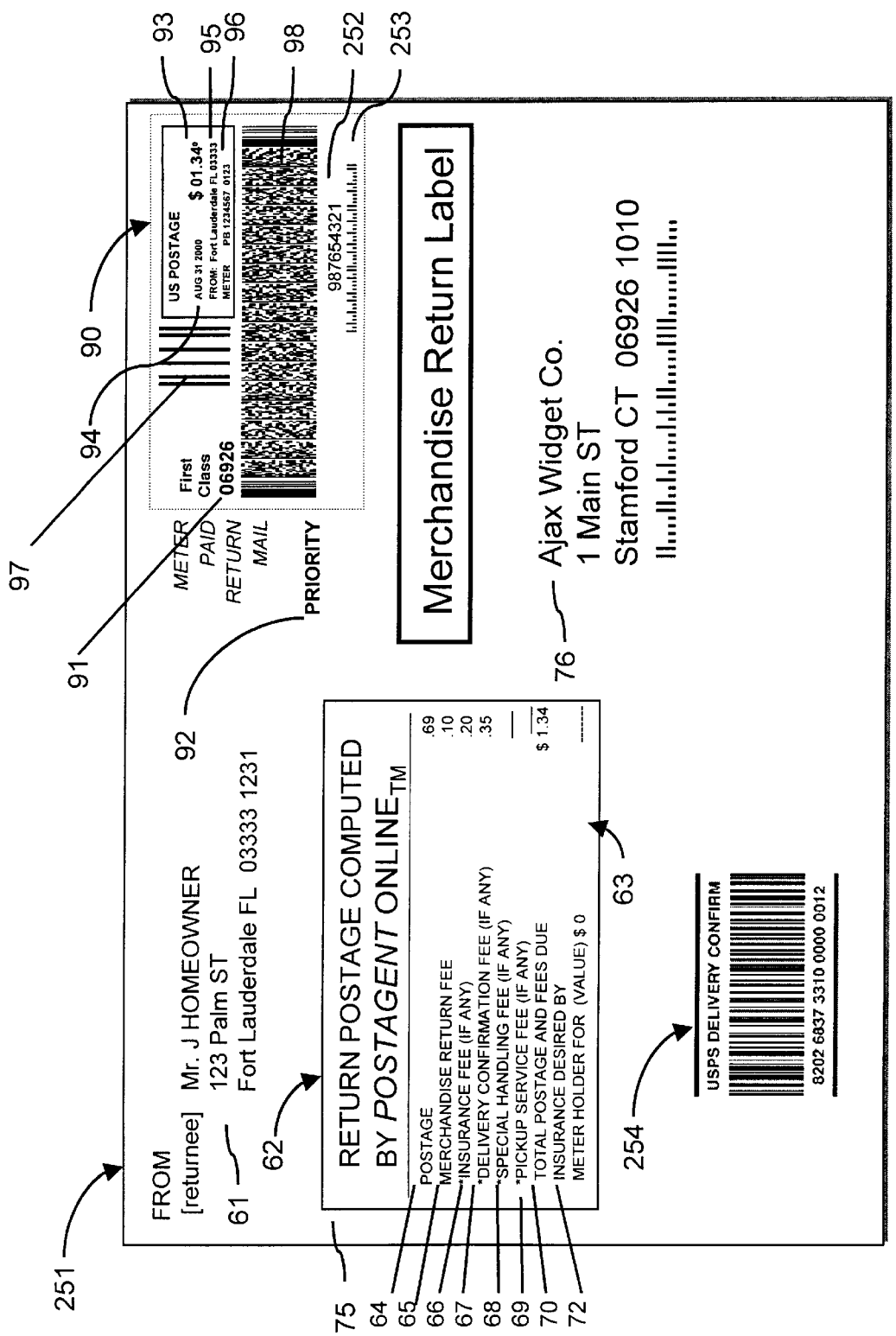
FIG. 3B is a drawing of a new Merchandise Return Label 251 that has an information-based indicia affixed thereto.

FIG. 3B is a drawing of a new Merchandise Return Label 251 that has an Information Based Indicia 90 affixed thereto. Label 251 was printed by printer 202 (FIG. 5), and the postage for printing label 251 was charged to an account associated with meter 103. The buyer's name and address 61 or the name and address of the person who is returning the goods are printed in the upper right corner of label 251. The name of the entity that computed the postage 75 that is due to deliver the goods that label 251 is affixed to is contained in rectangle 62. The charges: amount of postage 64 to deliver the goods that label 251 is affixed to; merchandise return fee 65; insurance fee 66; delivery confirmation fee 67; special handling fee 68; pick up service fee 69; total postage and fees due 70; insurance desired by meter holder 72 for (value) $0, are contained in rectangle 63. Spaces 73 are used by the entity that computed the postage 75 for entering: the amount of postage 64; the merchandise return fee 65; the insurance fee 66; the delivery confirmation fee 67; the special handling fee 68; the pick up service fee 69; the total postage and fees due 70; the insurance desired by meter holder 72. The name and address 76 of the seller or person to whom the goods are being shipped appear in the bottom right of label 251. The indicia 90 contains: a dollar amount 93 for the total postage and fees due; the date 94 that indicia 90 was generated; the place 95 of the computer that printed indicia 90; the postal security device serial number 96 or virtual meter number; a FIM code 97; a two-dimensional, encrypted bar code 98; the zip code 91 of the seller who is returning the goods that label 251 is affixed to; and the class of mail 92 to which label 251 is going to be affixed. A unique number 252 appears below indicia 90. Number 252 is encrypted and includes the date and time that indicia 54 was printed on label 49 and the weight of container 50 when it was originally sent from Ajax Widget Co. to Mr. J. Homeowner. Bar code 253 appears below number 252. Bar code 253 is a bar code representation of number 252. It is obvious to one skilled in the art that the information contained in bar code 253 may be incorporated into two-dimensional bar code 98. Delivery confirmation 254 is affixed to label 251.

Figure 3C:
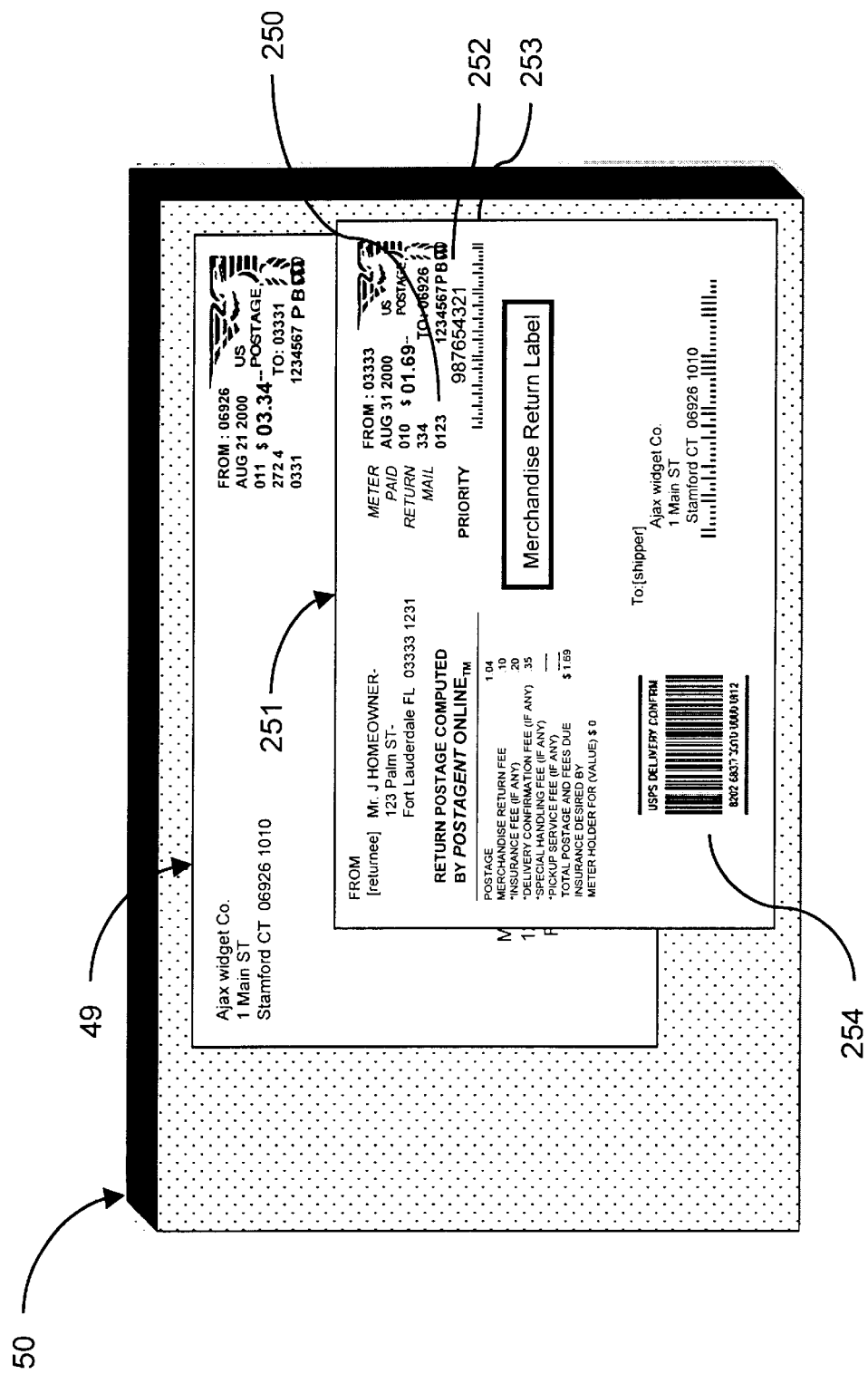
FIG. 3C is a drawing of label 49 affixed to container 50 and label 251 affixed to a portion of label 49.

FIG. 3C is a drawing of label 49 affixed to container 50, and label 251 affixed to a portion of label 49. Labels 49 and 251 are positioned in a manner that scanner 253 (FIG. 5) will be able to read the indicia on labels 49 and 251.

FIG. 4 is a drawing showing the manner in which goods are ordered. Seller 100 receives an inquiry from buyer 200 regarding the sale of specified goods. The inquiry may be between seller's personal computer 101 and buyer's personal computer 201 via communications link 219, i.e., the world wide web. After seller 100 and buyer 200 agree upon the terms and conditions of sale and return of the specified goods, the goods may be paid for with a credit card, and computer 101 causes computer 201 to enable printer 202 to print order confirmation 203. The goods are packed into a container and shipping process 102 determines the information needed to complete label 49 (FIG. 2) as well as some additional information. Process 102 will determine the name and address of the seller/sender and buyer/recipient, a description of each item packed in container 50 (FIG. 2), the weight of each item packed, the amount of postage in dollars, and the information contained in indicia 54.

Computer 101 will upload the foregoing information determined by process 102 to all return orders detailed data base 303 via communication link 105. Data base 303 is contained in meter returns data center 300. Meter with return data capture 103 is coupled to computer 101. An example of a meter having data capture is described in U.S. Pat. No. 5,111,030 entitled "Postal Charge Accounting System", herein incorporated by reference. Switch 610 is coupled to return meter data base 210 and meter 103. Switch 610 enables meter 103 to perform data capture, i.e., prepare the information contained in rectangle 62 (FIGS. 3A and 3B), and to produce zip code 91, class of mail 92, unique number 252 and bar code 253 (FIG. 3B). Meter 103 will print indicia 54 on label 49 (FIG. 2). Periodically, the data captured by meter 103 is uploaded to return usage data base 210 via communications link 104. Data base 210 is coupled to process 220. Periodically, validation process 220 will initiate an exchange of information between data base 303 and process 220 to assure that each metered label 49 has an associated data field in data base 303. The foregoing validates the data in data base 210 with data base 303. If the information in data base 210 is not the same as the information in data base 303, meter refill and payment center 209 will request that carrier 225 supply the missing data. Shipping process 102 will also deposit container 50 with carrier 225. Carrier 225 may be the United States Postal Service. Postal delivery process 226 will deliver container 50 to receive location 230. Center 209 will transmit information and payments regarding indicia 54 to financial process 228 via communication link 227.

Figure 5:
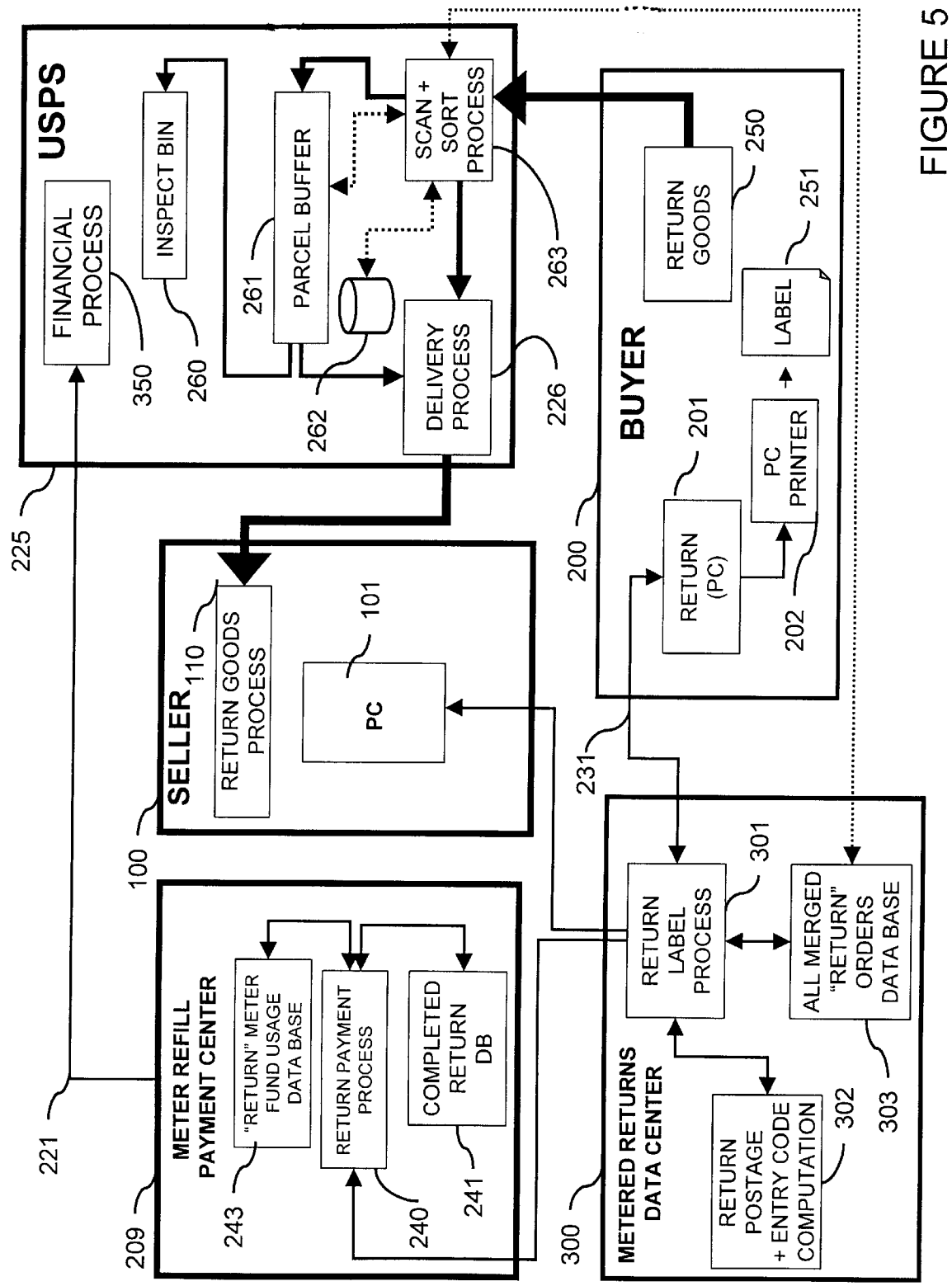
FIG. 5 is a drawing showing the manner in which goods are returned.
Figure 7A:
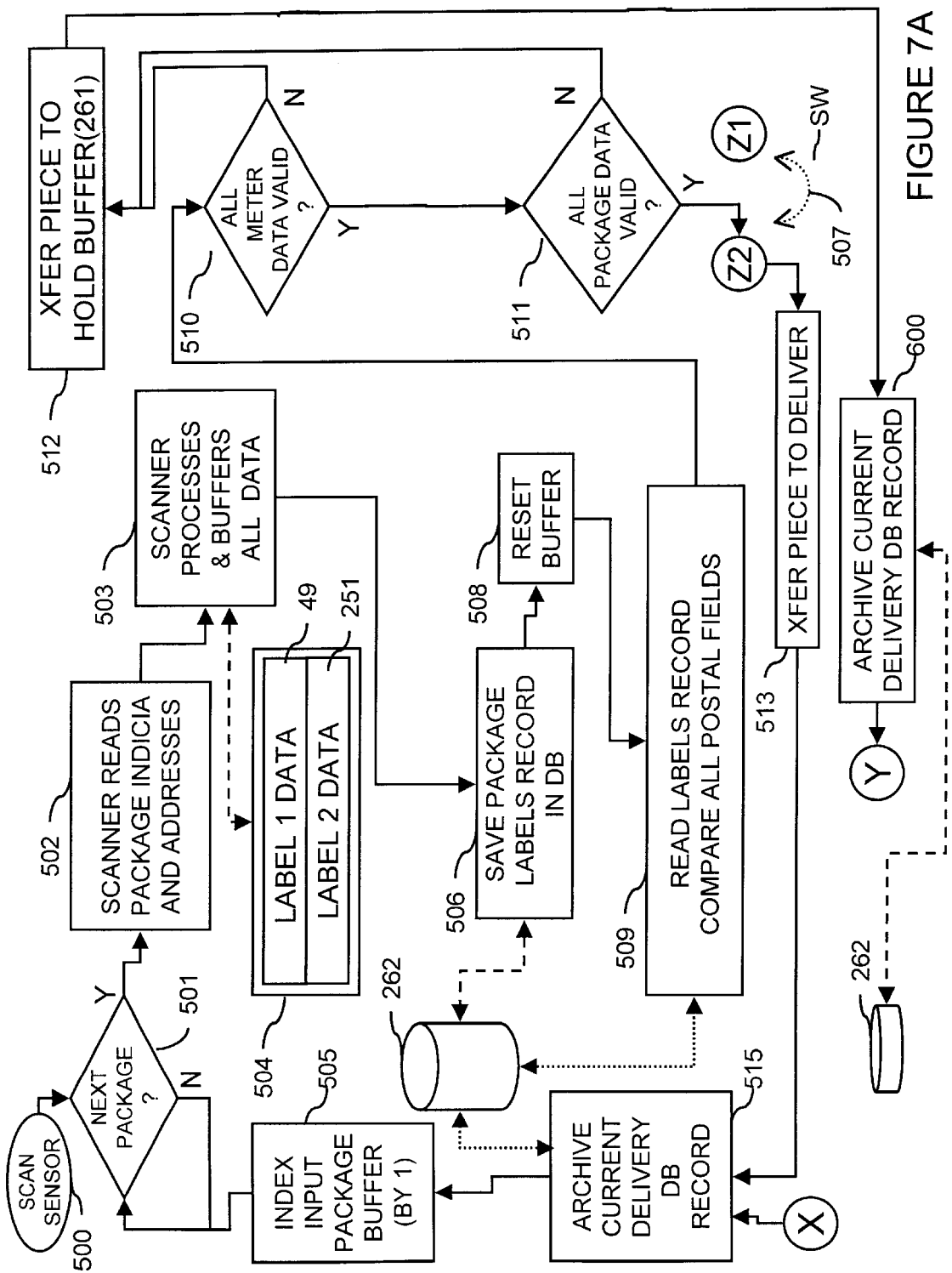
FIGS. 7A–7D is a flow chart showing the processing of container 50.
Figure 7B:
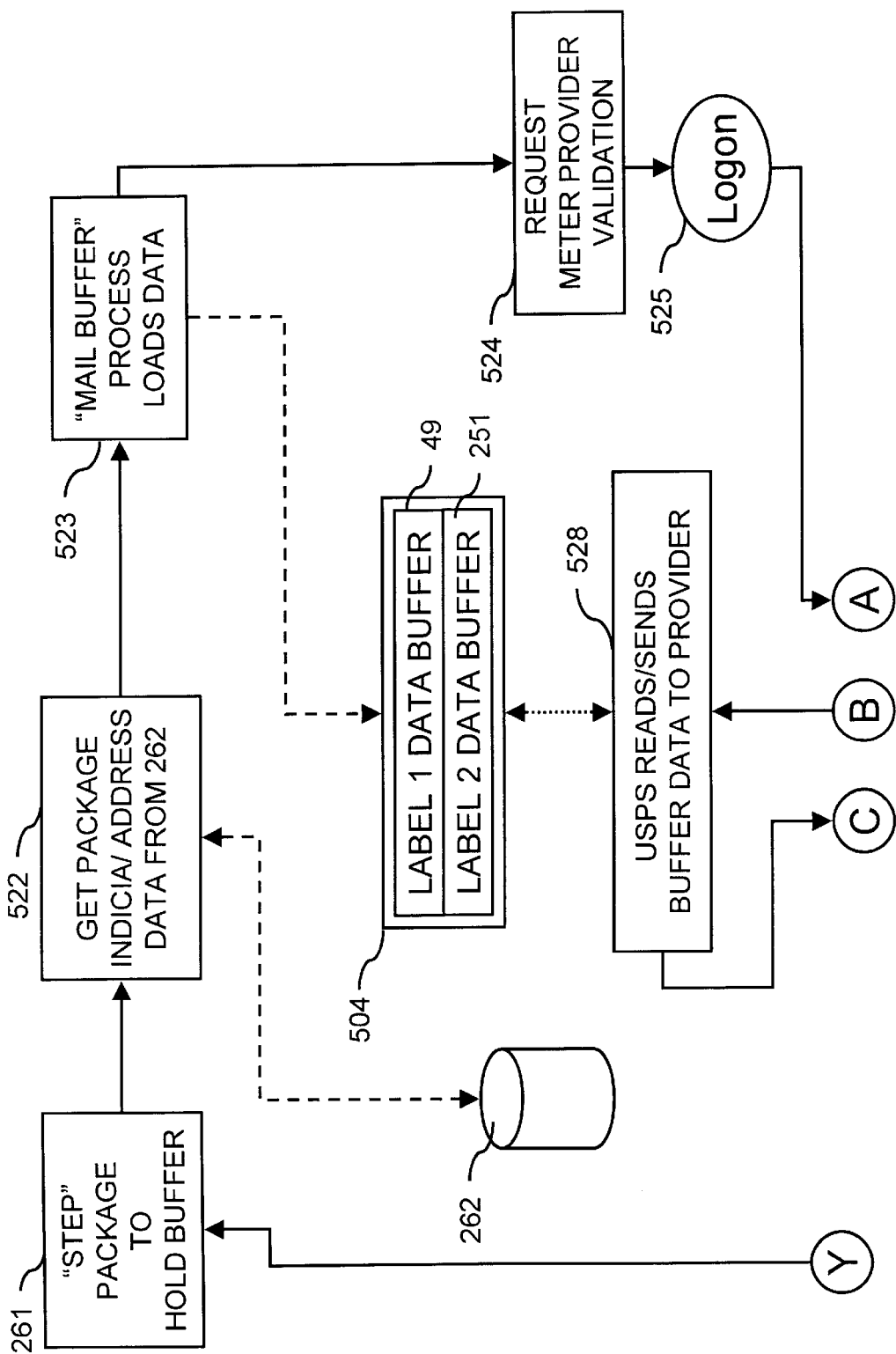

FIG. 5 is a drawing showing the manner in which goods are returned. After buyer 200 has examined the goods delivered to receive location 230 (FIG. 4) and determined that the goods are going to be returned to seller 100, buyer computer 201 contacts return process 301 via communications link 231. If seller 100 will accept return of the goods, return process 301 will inform buyer 200 to enter postal meter serial number 58 (FIG. 2) and security code 59 into computer 201 so that the above information will be received by return process 301. Process 301 will inform returns and postage computation 302 to use data base 303 to calculate the postage required to mail the goods back to seller 100 and enter the appropriate information in label 251 (FIGS. 3A and 3B). The above information and postage calculated will be stored in actual returned orders data base 303. Return process 301 will download label 251 to buyer computer 201 via communications link 231. Computer 201 will cause printer 202 to print label 251. Buyer 200 will place label 251 over label 49 on container 50 (FIG. 3C) containing the goods that are going to be returned to seller 100 via return 250. Scanner and sorter 263 will scan label 49 and store the information on label 49 in data base 262. Scanner and sorter 263 will scan label 253 and store the information contained in code 253 in data base 262. If the information in code 253 matches the information sent to data base 262, container 50 will be sent to delivery process 226. Delivery process 226 is coupled to return goods process 110. Seller 100 will receive the goods via delivery process 226, and buyer 200 will receive a refund via returned goods process 110. If the information in code 253 does not match the information sent to data base 262, container 50 will be transferred to parcel buffer 261 for further processing, which is hereinafter described in the description of FIGS. 7B–7D. The further processing described in FIGS. 7B–7D will determine whether or not container 50 will be transferred to delivery process 226 or inspect bin 260.

Computation 302 informs computer 101 via communications link 105 of the information that will be used to produce label 251. Computation 302 transmits a message to pay process 240. Completed return usage data base 241 is coupled to process 240, and pay used data base 243 is coupled to process 240. Process 240 utilizes data bases 241 and 243 to initiate payment of the funds to the post that are indicated on label 251. During the required data and transfer of funds from meter refill and payment center 209 to carrier 225, financial process 350 will receive the funds that are due the post from the foregoing transactions.

Figure 6A:
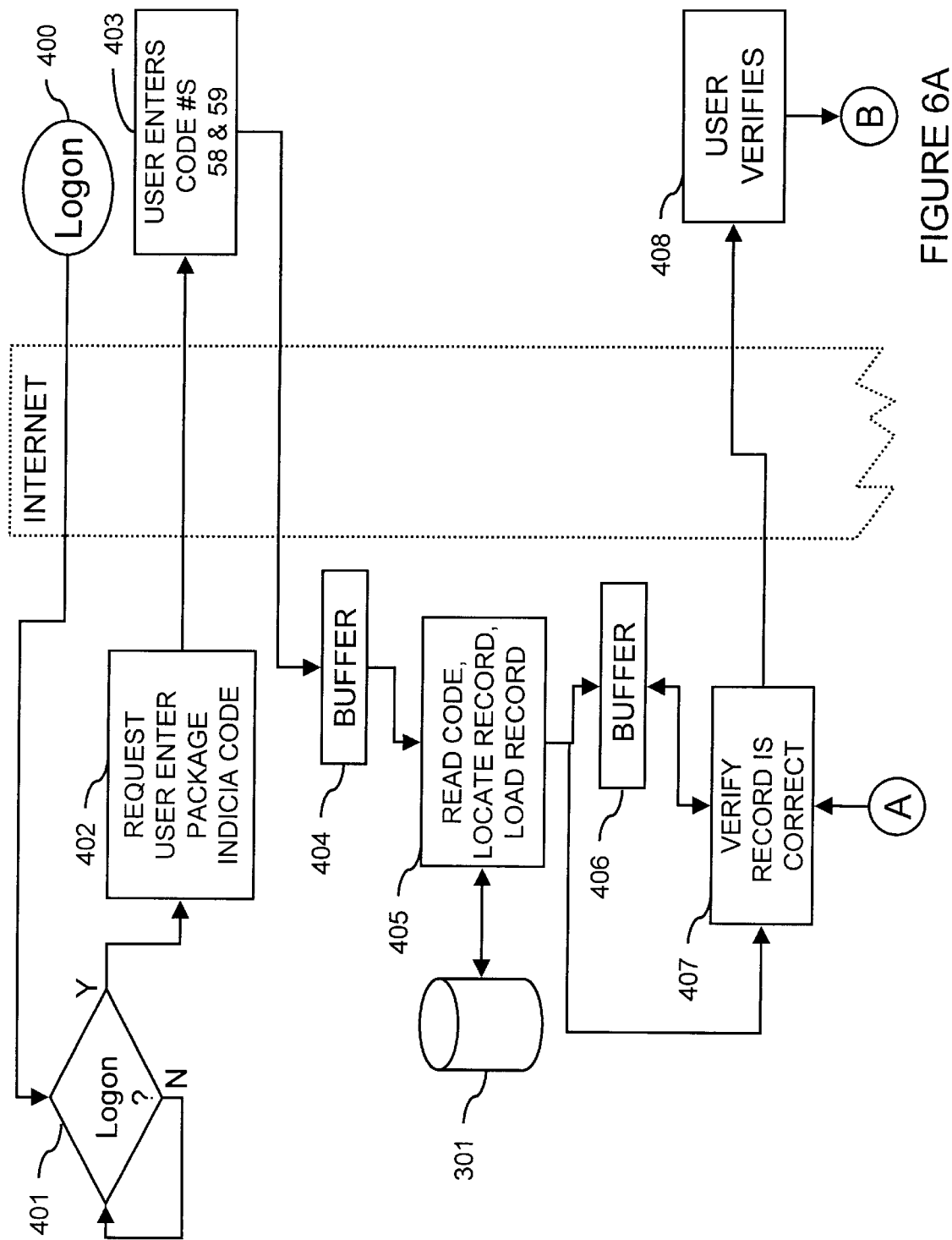
FIGS. 6A–6C is a flow chart showing the computing of return postage, formatting and printing Label 251.
Figure 6B:
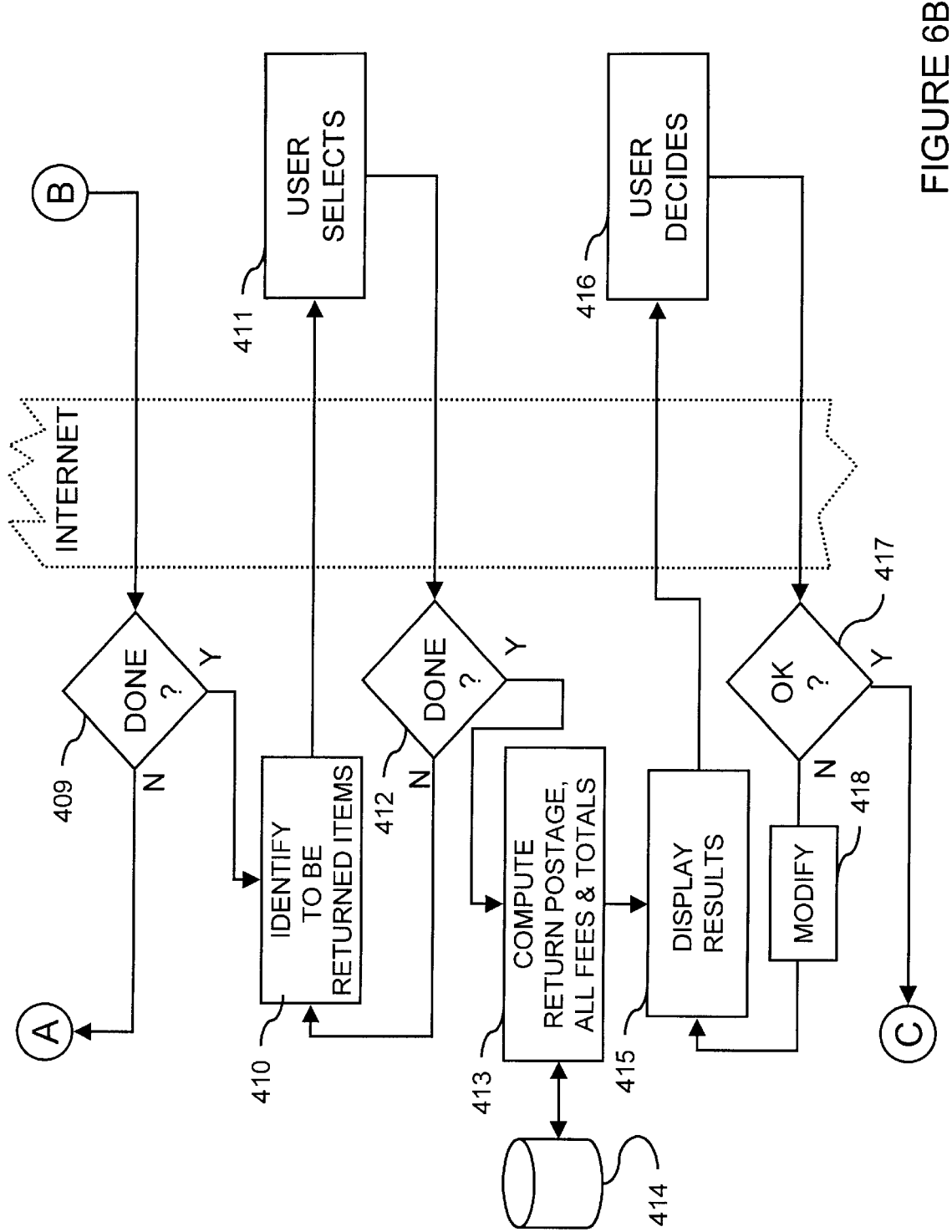
Figure 6C:
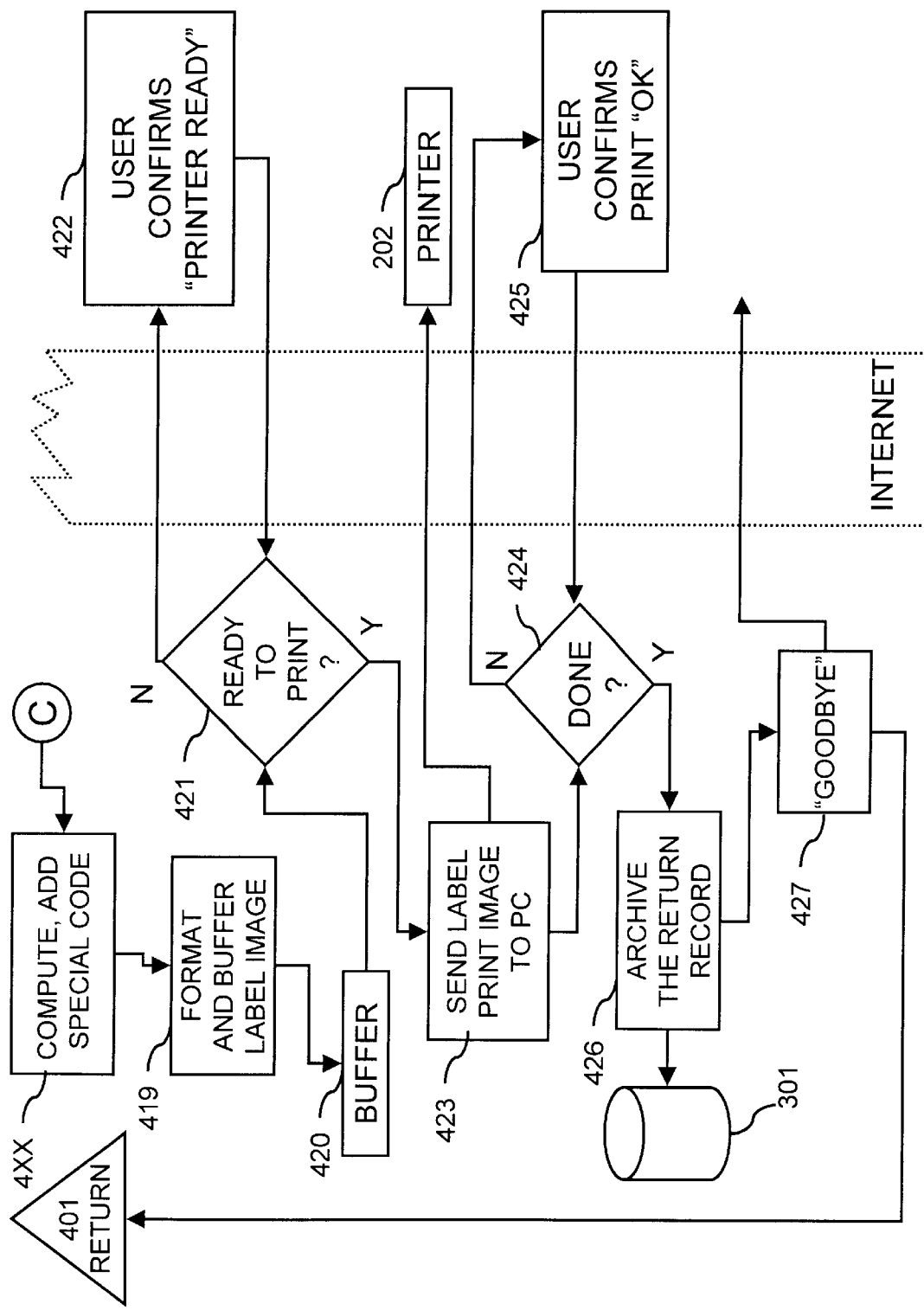

FIGS. 6A–6C is a flow chart showing the computing of return postage, formatting and printing Merchandise Return Label 251. The program starts in block 400 where the buyer logs onto the Metered Returns Data Center 300 (FIG. 5) internet site. Then the program goes to decision block 401. Decision block 401 determines whether or not the buyer has logged onto the Metered Returns Data Center 300 internet site. If the buyer has not logged onto Metered Returns Data Center 300 internet site, the program goes back to block 401. If the buyer has logged onto the Metered Returns Data Center 300 internet site, the program goes to block 402 to request the buyer to enter code 59 and number 58 from indicia 54 (FIG. 2). Now the program goes to decision block 403 where the buyer enters code 59 and number 58 from indicia 54. Then the program goes to buffer 404 to store code 59 and number 58. In block 405, buffer 404 is read. Then the read record is located in all return orders detailed data base 303. The read record is then sent to block 405 and loaded into buffer 406. Block 407 reads buffer 406 and transmits the read information to block 408 where the buyer verifies the transmitted information, i.e., the buyer confirms his/her name and address, his/her order and the items in his/her order.

Then the program goes to decision block 409 (FIG. 6B). Block 409 determines whether or not the buyer has verified the transmitted information. If block 409 determines that the buyer has not verified the transmitted information, the program goes back to block 407. If block 409 determines that the buyer has verified the transmitted information, the program goes to block 410 to ask the buyer to identify the items the buyer wants to return. Then the program goes to block 411 where the buyer identifies the items that he/she is going to return. Now the program goes to decision block 412. Block 412 determines whether or not the buyer has identified the items he/she wants to return. If block 412 determines that the buyer has not identified the items that he/she is going to return, the program goes back to the input of block 410. If block 412 determines that buyer identified the items that he/she is going to return, the program goes to block 413.

Block 413 computes the return postage, fees and total cost that are due for returning the goods. Block 413 uses the postal rates and postal fees in block 414 as well as the known weight of the returned goods in computing the total postage and fees required to return the goods. Then the program goes to block 415 to display the results of the calculation performed in block 413 to the buyer. Now the program goes to block 416 where the buyer decides if the postage, fees and other label information are correct. The buyer or the seller may be obligated to pay the postage and fees in accordance with an agreement between the buyer and the seller. At this point, the program goes to decision block 417. Block 417 determines whether or not the buyer wants to modify the displayed postage, fees or other label information, i.e., does the buyer want to insure the returned goods, etc. If block 417 determines that the buyer wants to modify the displayed postage, fees or other label information, the program goes to block 418 to enable the buyer to modify the postage, fees or other label information, i.e., by selecting a different type of service or class of service, etc. Then the program goes back to block 415 where the postage, fees or other label information selected by the buyer are displayed to the buyer. If block 417 determines that the buyer does not want to modify the displayed postage, fees and other label information, the program goes to block 419 (FIG. 6C). Block 419 formats and buffers the information needed to produce label 251. Then the program goes to buffer 420. When buffer 420 is full, the program goes to decision block 421.

Block 421 determines whether or not buyer printer 202 (FIGS. 4 and 5) is ready to print. If block 421 determines that printer 202 is not ready to print, the program goes to block 422 to ask the buyer whether or not printer 202 is ready to print. If the buyer states that printer 202 is ready to print, block 421 will have an output on its "yes" line. Then the program goes to block 423 to transmit the information required to print label 251 to printer 202. Then the program goes to decision block 424. Block 424 determines whether or not printer 202 is finished printing. If block 424 determines that printer 202 is not finished printing, the program goes to block 425 to ask the buyer whether or not printer 202 has finished printing. If the buyer states that printer 202 has finished printing, block 424 will have an output on its "yes" line. Then the program goes to block 426 to archive the record. The record is then stored in all return orders detailed data base 303. Then the program displays "good-bye" to the buyer and returns to the input of block 401.

FIGS. 7A–7D is a flow chart showing the processing of container 50. In block 500, scanner 263 (FIG. 5) scans labels 49 and 251. Then the program goes to decision block 501. Block 501 determines whether or not the container being scanned is a new container. If block 501 determines that a new container is being scanned, the program goes to block 502, where scanner 263 reads the indicia on labels 49 and 251 and the address data on label 251. Now the program goes to block 503, where scanner 263 processes the data in label 49 and label 251. The aforementioned label data is loaded into buffer 504. Then the program goes to block 506.

Block 506 archives the container 50 records, i.e., information in labels 49 and 251, in data base 262. Then the program goes to block 508. Block 508 resets buffer 504. Then the program goes to block 509. Block 509 reads labels 49 and 251 and compares one or more of the postal data fields, i.e., the seller's name and address including zip code, etc. contained in labels 49 and 251.

Then the program goes to decision block 510. Decision block 510 determines whether or not the meter information in labels 49 and 251 is correct. If Block 510 determines that the meter information in labels 49 and 251 is not correct, the program goes to block 512 to transfer the container to hold buffer 261. If Block 510 determines that the meter information in labels 49 and 251 is correct, the program goes to decision block 511. Decision block 511 determines whether or not the information in labels 49 and 251 is valid. If block 511 determines that the information in labels 49 and 251 is not valid, the program goes to block 512 to transfer the container to hold buffer 261. Then the program goes to block 600 to archive the current delivery record in data base 262. Now the program goes to block 261 (FIG. 7B) to step container to hold buffer 261. Now the program goes to block 522 to obtain the container 50 indicia/address from data base 262.

Figure 7C:
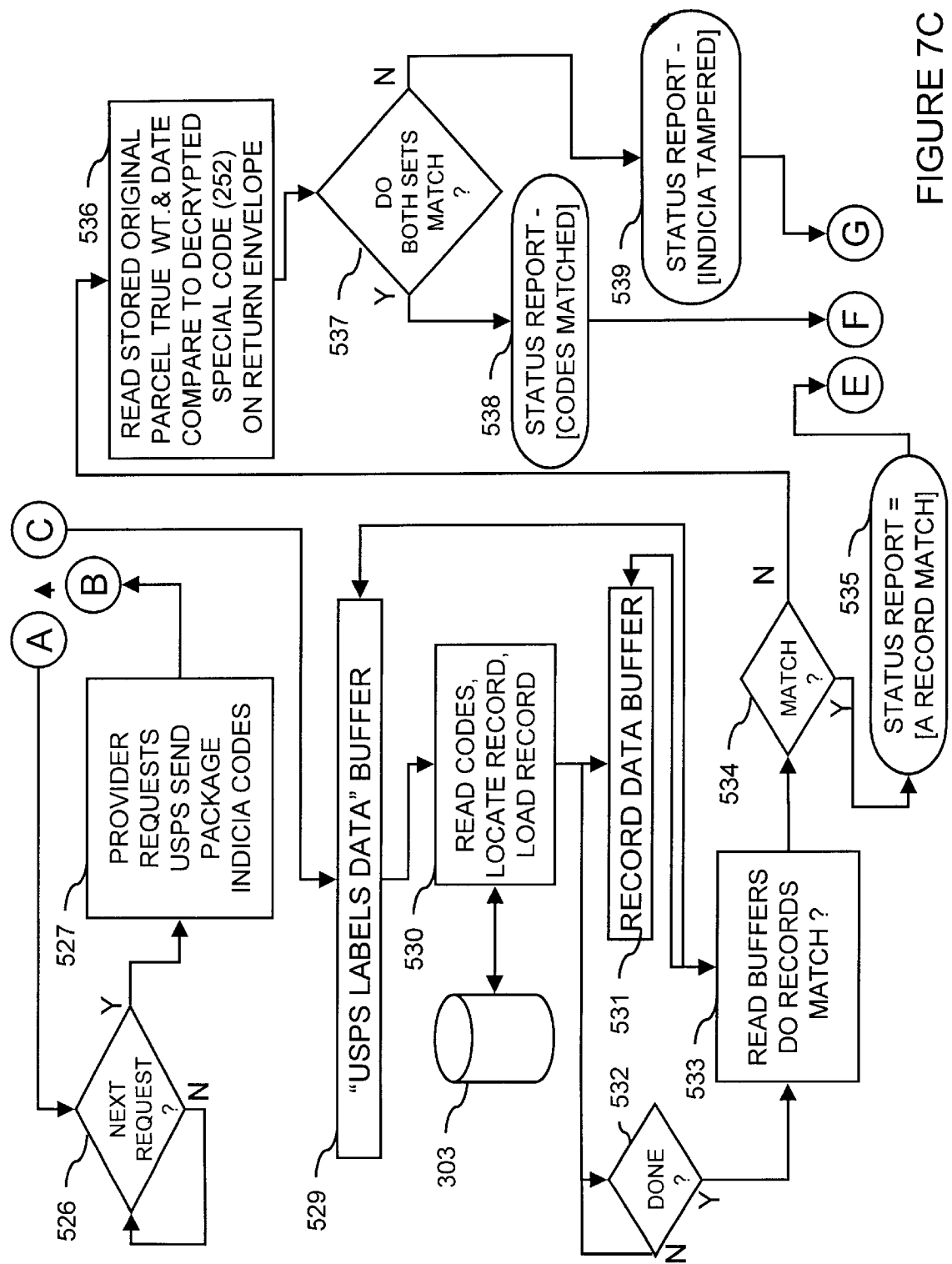

Then the program goes to block 523 to load the data from block 504 (labels 49 and 251). Then the program goes to block 524 to request from the meter provider the information that was used to produce labels 49 and 251. At this point, the program goes to block 525 to log onto the internet. Then the program goes to decision block 526 (FIG. 7C). Decision block 526 determines whether or not this is the next logon request. If block 526 determines that this is not the next request, the program goes back to the input of block 526. If block 526 determines that this is the next request, the program goes to block 527, where the meter provider requests that the carrier send the container 50 indicia codes. Then the program goes to block 528 (FIG. 7B), reads, and sends the buffer data in buffer 504 to the meter provider.

Figure 7D:
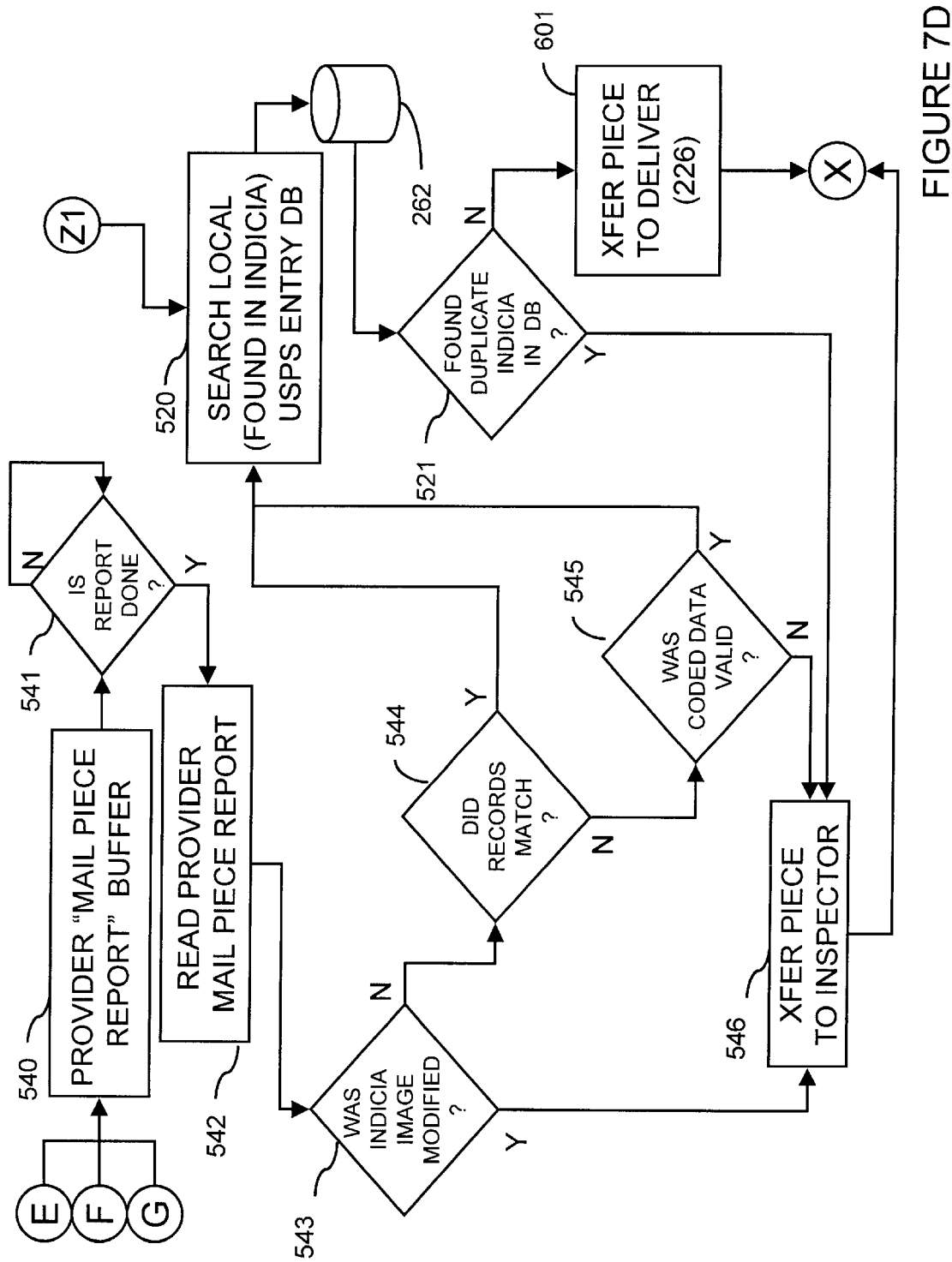

Then the program goes to block 529 (FIG. 7C) where the name, address and indicia information on labels 49 and 251 are stored in buffer 529. Now the program goes to block 530 to read the codes in data buffer 529, locate the matching record in data base 303 and load the record into data buffer 531. Then the program goes to block 533 to read the buffers in blocks 529 and 531. Then the program goes to decision block 534. Block 534 determines whether or not the information in buffers 529 and 531 match. If block 534 determines that the information in buffers 529 and 531 match, the program goes to block 540 (FIG. 7D). If block 534 determines that the information in buffers 529 and 531 do not match, the program goes to block 536. Block 536 reads the stored original container true weight and date that indicia 49 was affixed to the container and compares it to the decrypted bar code 253 on Merchandise Return Label 251.

At this juncture, the program goes to decision block 537. Block 537 determines whether or not the stored original container true weight and date that indicia 49 was affixed to the container matches the decrypted portion of bar code 253 on Merchandise Return Label 251 that relates to the stored original container true weight and date that indicia 49 was affixed to the container. If block 537 determines that the above information matches, the program goes to block 538 to prepare a status report where information matches. Then the program goes to block 540 (FIG. 7D). If block 537 determines that the above information does not match, the program goes to block 539 to prepare a status report where the information has been tampered. Then the program goes to block 540 (FIG. 7D). Then the program goes to decision block 541. Decision block 541 determines whether or not the report has been completed. If block 541 determines that the report has not been completed, the program goes back to the input of block 541. If block 541 determines that the report has been completed, the program goes to block 542 to read the container report. Now the program goes to decision block 543. Block 543 determines whether or not the indicia image on labels 49 and 251 were modified. If block 543 determines that the indicia image on labels 49 and 251 was modified, the program goes to block 546 to transfer the container to inspect bin 260 (FIG. 5). Then the program goes to block 501 (FIG. 7A) via blocks 515 and 505. If block 543 determines that the indicia image on labels 49 and 251 was not modified, the program goes to decision block 544. Block 544 determines whether or not the read records from labels 49 and 251 match. If block 544 determines that the records match, the program goes to block 520 to search the carrier data base 262. Then the program goes to decision block 521. Block 521 determines whether or not a duplicate indicia was found in data base 262. If block 521 does not find a duplicate indicia in data base 262, the program goes to block 601 to transfer the container to delivery process 226. Then the program goes to block 501 (FIG. 7A) via blocks 515 and 505. If block 521 finds a duplicate indicia in data base 262, the program goes to block 546 to transfer the container to inspect bin 260 (FIG. 5). Then the program goes to block 501 (FIG. 7A) via blocks 515 and 505. If block 544 determines that the records do not match, the program goes to decision block 545.

Block 545 determines whether or not bar code 253 is valid. If block 545 determines that bar code 253 is not valid, the program goes to block 546 to transfer the container to inspect bin 260. If block 545 determines that the bar code 253 is valid, the program goes to block 520 to search the carrier entry data base 262. Then the program goes to decision block 521 to check for duplicate indicia. If block 521 does not find a duplicate indicia in data base 262, the program goes to block 601 to transfer the container to delivery process 226. Then the program goes to block 501 (FIG. 7A) via blocks 515 and 505.

If block 511 determines that the information in labels 49 and 251 is valid, the program goes to switch 507. Switch 507 is set to position Z2 for enhanced security. Then the program goes to sort to block 513 to transfer process 226 (FIG. 5). Now the program goes to archive delivery data base record 515. Then the program goes to block 505 to index the next container in parcel buffer 261 (FIG. 5). Then the program goes back to the input of decision block 501. If switch 507 is set to position Z1 for normal acceptance procedure, the program goes to block 520 (FIG. 7D) to search data base 262 for duplicate entrees.

At this point, the program goes to decision block 521. Block 521 determines whether or not any duplicate indicia were found in data base 262. If block 521 determines that duplicate indicia were not found in data base 262, then the program goes to block 601 to transfer the container 50 to the delivery process 226. Now the program goes to archive delivery data base record 515 (FIG. 7A) and then to blocks 505 and 501. If block 521 determines that duplicate indicia were found in data base 262, then the program goes to block 546 (FIG. 7D) to transfer the container to inspect bin 260 (FIG. 5). Then the program goes to block 515 archive delivery block 505 and on to block 501 to wait for the next container.

The above specification describes a new and improved Merchandise Return Label that contains a unique number. The Merchandise Return Label may be printed on a buyer's computer printer and paid for by the seller's postage meter. It is realized that the above description may indicate to those skilled in the art additional ways in which the principles of this invention may be used without departing from the spirit. Therefore, it is intended that this invention be limited only by the scope of the appended claims.

What is claimed is:

1. A method for a buyer to return goods to a seller, said method includes the steps of:
   A) packing buyer ordered goods in a container addressed to the buyer;
   B) affixing a metered indicia to the container, that identifies the container and its contents, which is charged to a seller's meter for delivery of the container;
   C) sending information in the indicia, the buyer's address and container contents to one or more data centers;
   D) delivering the container to the buyer;
   E) notifying a data center of the buyer's intention to return all or some of the goods in the container;
   F) forming at the data center a label having a metered indicia that has a unique number that information contained in the indicia that was affixed to the container in step B, wherein the indicia formed at the data center is charged to the seller's meter;
   G) delivering the label to the buyer;
   H) affixing the label to the container or affixing the label to a return container containing the goods the buyer is returning to the seller; and
   I) delivering the container having the returned goods to the seller.

2. The method claimed in claim 1, further including the step of:
   crediting the buyer for the returned goods.

3. The method claimed in claim 1, wherein the label is delivered to the buyer via the internet.

4. The method claimed in claim 1, wherein the label is delivered to the buyer via facsimile.

5. The method claimed in claim 1, wherein the label is delivered to the buyer by expedited mail service.

6. The method claimed in claim 1, further including the step of:
   charging a seller for the amount debited to the seller's meter at the data center.

7. The method claimed in claim 6, wherein the carrier is the United States Postal Service.

8. The method claimed in claim 6, wherein the carrier is a private delivery service.

9. The method claimed in claim 6, wherein the carrier is a goods pick up service.

10. The method claimed in claim 1, wherein the label includes carrier fees for selected services to deliver the container to the seller.

11. The method claimed in claim 10, wherein the data center calculates the total fees that are due the carrier for the selected services.

12. The method claimed in claim 1, wherein the unique number is encrypted.

13. The method claimed in claim 1, wherein the unique number includes the weight of the container in step B.

14. The method claimed in claim 1, wherein the unique number includes information about the indicia that was affixed to the container in step B.

15. The method claimed in claim 1, wherein the unique number includes the date and time that the indicia that was affixed to the container in step B.

16. A method for a buyer to return goods to a seller, said method includes the steps of:
   A) delivering buyer ordered goods in a container addressed to the buyer having a metered indicia affixed to the container, that identifies the container and its contents, which is charged to a seller's meter for delivery of the container;
   B) sending information in the indicia, the buyer's address and container contents to one or more data centers;
   C) delivering the container to the buyer;
   D) notifying a data center of the buyer's intention to return all or some of the goods in the container;
   E) forming at the data center a label having a metered indicia that has a unique number that information contained in the indicia that was affixed to the container in step A, wherein the indicia formed at the data center is charged to the seller's meter; and
   F) delivering the container with the labels affixed thereto and containing the returned goods to the seller.

17. The method claimed in claim 16, further including the step of:
   reading the metered indicia to determine whether or not the indicia have been paid for.

18. The method claimed in claim 16, wherein the unique number is encrypted.

19. The method claimed in claim 16, wherein the unique number includes the weight of the container in step A.

20. The method claimed in claim 16, wherein the unique number includes information about the indicia that was affixed to the container in step A.

21. The method claimed in claim 16, wherein the unique number includes the date and time that the indicia that was affixed to the container in step A.

* * * * *